P. H. DAWE.
ELECTRICAL RESISTANCE APPARATUS.
APPLICATION FILED AUG. 25, 1917.

1,398,630.

Patented Nov. 29, 1921.
2 SHEETS—SHEET 1.

Inventor:-
Philip Henry Dawe
By:- B. Singer.
Atty.

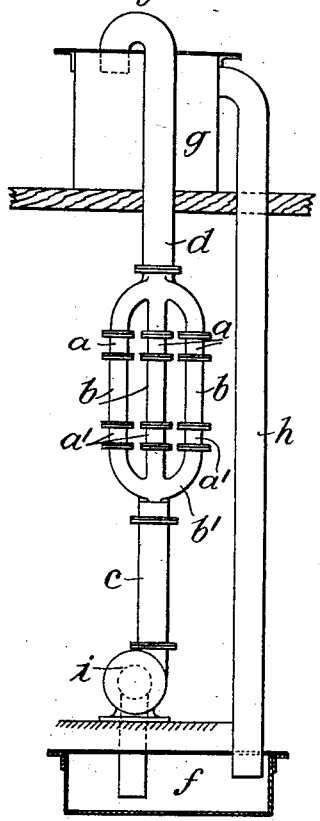
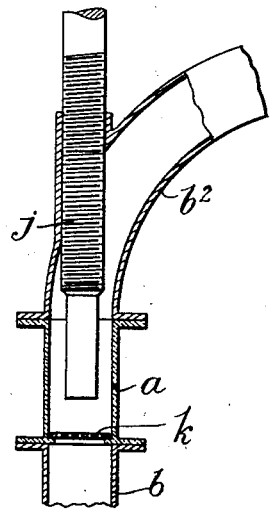

UNITED STATES PATENT OFFICE.

PHILIP HENRY DAWE, OF LONDON, ENGLAND.

ELECTRICAL RESISTANCE APPARATUS.

1,398,630.     Specification of Letters Patent.     Patented Nov. 29, 1921.

Application filed August 25, 1917. Serial No. 189,234.

(GRANTED UNDER THE PROVISIONS OF THE ACT OF MARCH 3, 1921, 41 STAT. L., 1313.)

*To all whom it may concern:*

Be it known that I, PHILIP HENRY DAWE, a subject of the King of Great Britain and Ireland, residing at Dacre House, Victoria street, London, England, have invented certain new and useful Improvements in Electrical Resistance Apparatus, of which the following is a specification.

This invention relates to and comprises apparatus for absorbing energy and means for varying the energy so absorbed in an electrical circuit.

In this invention a liquid is made to pass continuously through a conduit of given cross-sectional area the resistance being produced by the non-conducting properties of the liquid. It is desirable for reasons of convenience and safety that the apparatus and electrical connections should be such that the liquid at the inflow and outflow is at earth potential.

According to the invention the apparatus comprises a tube or tubes or conduits built up of alternate sections of insulating and conducting material. The number of sections or composite tubes or conduits thus constituted employed in each apparatus may vary according to the resistance required but any number of tubes or conduits may be grouped together and connected to common inflows and outflows thus forming a multiple unit system.

In a practical form of apparatus for carrying out the invention the composite tube is formed of insulating sections of porcelain or other suitable material preferably so shaped that parts thereof are interposed in the path of the current between the electrodes and separated by metal sections forming or containing the electrodes and joined at their outer ends to other metal sections at earth potential; or, the apparatus may consist of two, three or more of such composite tubes with common inflows and outflows thus enabling the apparatus to be used on two or three-wire or single or multi-phase circuits. Means may be provided for short-circuiting portions or the whole of the length of total resistance or where flexibility and ready variation is desirable the apparatus can be connected to a controller.

The invention is hereinafter further described with reference to the accompanying drawings in which similar letters of reference denote similar parts throughout the different figures.

Fig. 3 is an elevation of a liquid resistance apparatus including tubes as shown in Fig. 1 but on a smaller scale and means for circulating liquid through the same.

Fig. 4 is a section on a larger scale illustrating a method of varying the resistance.

Figure 1:
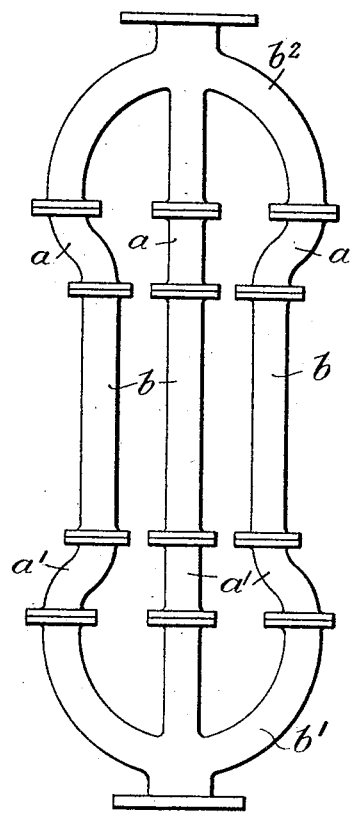
Figure 1 is an elevation of one construction and arrangement of composite tubes or conduits employed in a liquid resistance constructed according to this invention.
Figure 2:
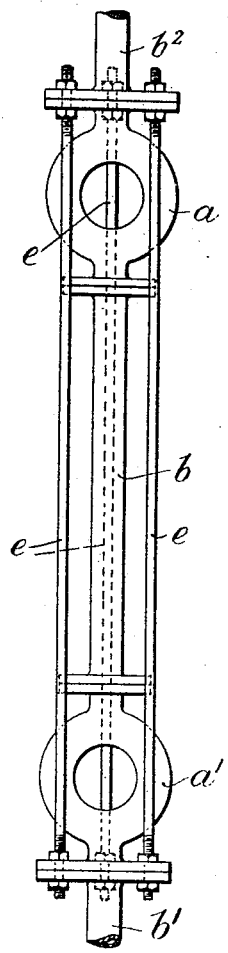
Fig. 2 is a similar view to Fig. 1, illustrating a modified form of construction of composite tube.

In the apparatus shown in Figs. 1 and 3 three composite tubes are grouped together each tube being built up of two insulating sections or lengths $a$ $a'$ of porcelain or other material, an interposed metal section $b$ forming the electrode to which the conductor is connected, and metal end sections $b'$ $b^2$ fixed to the outer ends of the insulating sections $a$ $a'$ and connected with inflow and outflow pipes such as are shown at $c$ $d$ Fig. 3. The insulating sections or lengths of tubing $a$ $a'$ may be curved as shown in Fig. 1 so that the walls thereof lie more or less across the direct path of the current between the electrodes $b$—$b'$ or $b$—$b^2$, or the said insulating section may be made annular as illustrated in Fig. 2 in which case the inner wall of the annulus lies in the direct path of the current. Flanges provided on the various tube sections enable them to be fixed together by bolts. As both end sections $b'$ $b^2$ of the tube or group of tubes should preferably be directly earthed, they are connected together by metal bars, rods or other suitable means, and to a common earth connection. A convenient method of connection applicable to the form of construction shown in Fig. 2 is by passing screw threaded rods or stays $e$ through the jointing flanges of the end and insulating sections and securing them to the flanges by nuts. These rods besides serving to equalize the potential also strengthen the structure of the apparatus and assist in holding it together. A liquid forming the resistance is circulated continuously through the composite tubes by suitable means. In Fig. 3 a circulating system is illustrated including tanks $f$ $g$ at different levels connected by an overflow pipe $h$, the group of composite tubes $a$ $a'$ $b$ $b'$ $b^2$ being arranged between the tanks $f$ $g$ and having the inflow pipe $c$ connected with a pump $i$ which forces liquid from the lower tank $f$ through the inflow pipe $c$ and composite tubes to the outflow pipe $d$ and tank $g$ from whence it returns through the pipe $h$ to the lower tank.

As before described the number of composite tubes employed for each liquid resistance or power absorption apparatus may be varied according to the nature of the current to be dealt with, single-phase, two-phase or three-phase-alternate current for example, or the total resistance required, it being preferable to increase the number of tubes rather than to employ an increased diameter of tube or conduit where the energy absorption capacity is required to be high.

A means for short circuiting a portion of the liquid resistance of a tube or conduit is illustrated in Fig. 4 and consists in introducing a screw threaded metal rod or spindle $j$ through the end section into the tube whose resistance is to be controlled. By this means a portion of the resistance represented by the liquid in the insulating section $a$ can be short-circuited by the spindle $j$ which forms in effect an extension of the electrode $b^2$. In order to prevent arcing when the spindle $j$ approaches the electrode $b$ an insulating grid $k$ is placed in the insulating section $a$ near the electrode $b$. It will be evident that each composite tube or conduit for the liquid resistance may be provided with a resistance varying rod or spindle as described and in the case of a group of tubes the various rods or spindles for different tubes could be geared together and operated from a single hand-wheel.

Although the improved apparatus hereinbefore described has been referred to throughout as a resistance it will be readily seen that it could also be employed where it is desired to subject liquids or the like to the action of electric current, the said liquids or the like being passed through the apparatus in the same manner as the resistance liquid and being subjected to the action of the current therein.

Having now particularly described and ascertained the nature of my said invention and in what manner the same is to be performed, I declare that what I claim is:—

1. An electric apparatus of the character described, comprising a plurality of tubular elements, some of insulating and some of conductive material alternatingly disposed forming a conduit for a liquid medium adapted to be acted upon by the electric current, said conductive elements constituting the electrodes, and means for continuously passing the said liquid medium through said conduit.

2. An electric apparatus of the character described, comprising a plurality of tubular elements, some of insulating and some of conductive material forming a conduit for a liquid medium adapted to be acted upon by the electric current, said conductive elements constituting the electrodes, and said insulating elements shaped to project into the path of the current between the conductive elements or electrodes, substantially as described and for the purpose set forth.

In testimony whereof I have affixed my signature.

PHILIP HENRY DAWE.